Figure 1:
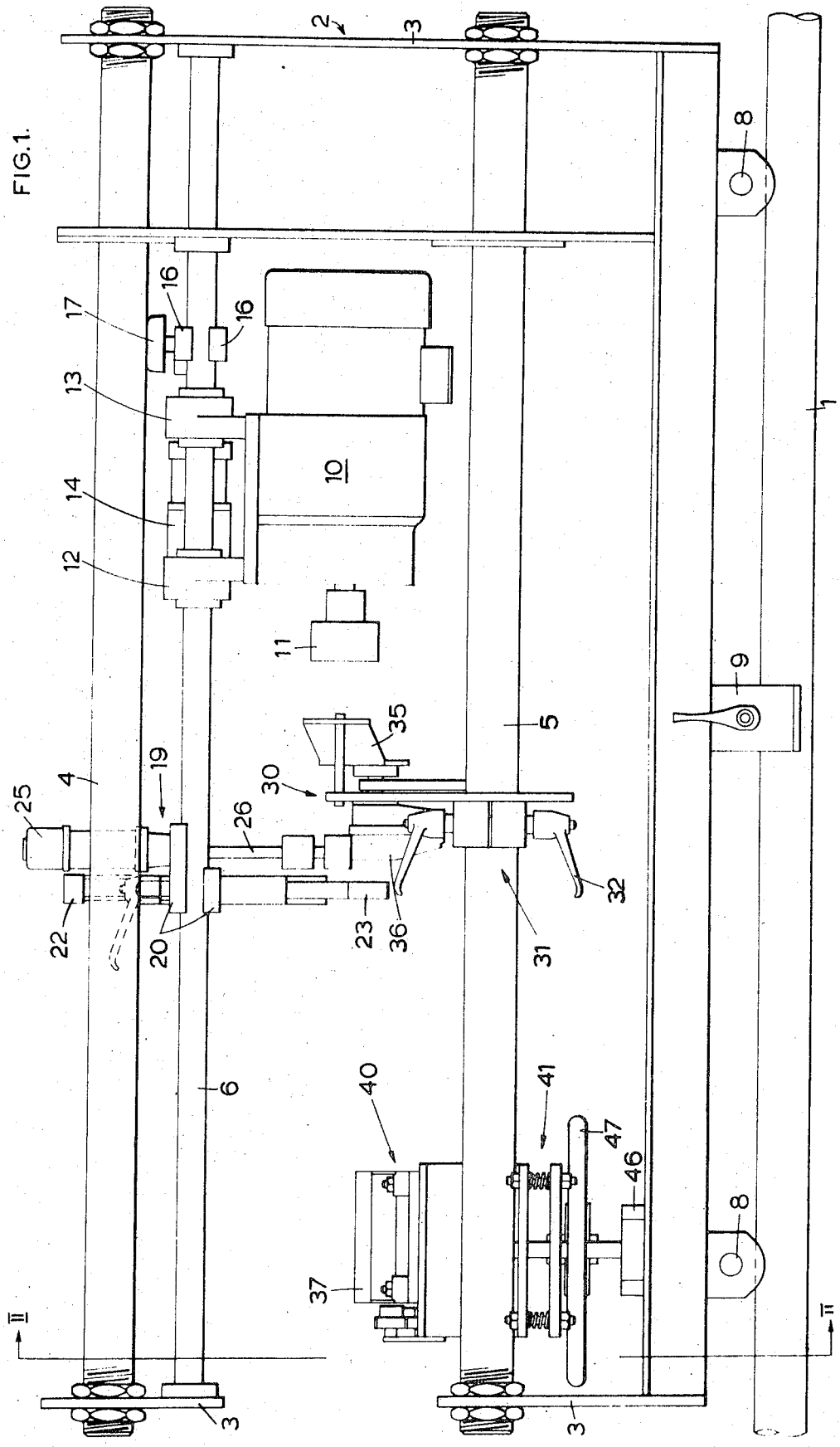

United States Patent [19]
Walker

[11] 3,851,991
[45] Dec. 3, 1974

[54] APPARATUS FOR THE AUTOMATIC OR SEMI-AUTOMATIC REMOVAL OF SURPLUS MATERIAL FROM THE END PORTIONS OF ELONGATE WORKPIECES OF SUBSTANTIALLY CIRCULAR CROSS-SECTION

[76] Inventor: Derek William Ross Walker, Four Gates, Claverley, Wolverhampton, England

[22] Filed: Nov. 30, 1973

[21] Appl. No.: 420,693

[30] Foreign Application Priority Data
Nov. 30, 1972 Great Britain...................... 55313/72
Jan. 19, 1973 Great Britain...................... 2868/73

[52] U.S. Cl.................... 408/37, 408/39, 408/40, 408/69, 408/104, 90/14, 82/2.7, 82/102
[51] Int. Cl........................................... B23b 39/22
[58] Field of Search............ 408/37, 39, 40, 41, 52, 408/69, 104, 105; 90/14

[56] References Cited
UNITED STATES PATENTS
1,686,841 10/1928 Briese et al........................ 408/41
3,494,254 2/1970 Barfred.............................. 90/14

Primary Examiner—Gil Weidenfeld
Attorney, Agent, or Firm—Scrivener Parker Scrivener & Clarke

[57] ABSTRACT

An apparatus for the automatic or semi-automatic removal of surplus material from the end portions of elongate workpieces of circular cross-section such as bars or tubes. The apparatus may be in the form of a single machine unit or a pair of opposite handed spaced units between which the workpiece extends during a machining operation.

In both single and spaced units a support frame carries at least one horizontal slide slidably mounting at least one pair of opposed cutting heads for driving rotary cutters. The cutters have shaped contact faces which automatically centre the workpiece when the faces contact the ends of the workpiece as the cutters move towards each other.

A resiliently mounted workpiece support is adjustably mounted below the cutter axis which co-operates with a workpiece clamp so that a workpiece may be movably held in approximately the desired machining position prior to contact by the cutters. A laterally disposed ramp enables workpieces to be fed successively to the support. A movable stop is provided to enable a workpiece to be stopped on the support prior to being clamped for the machining operation and released therefrom after machining. Control apparatus is provided for controlling the operation of the movable components in a desired sequence.

20 Claims, 14 Drawing Figures

APPARATUS FOR THE AUTOMATIC OR SEMI-AUTOMATIC REMOVAL OF SURPLUS MATERIAL FROM THE END PORTIONS OF ELONGATE WORKPIECES OF SUBSTANTIALLY CIRCULAR CROSS-SECTION

This invention relates to an improved apparatus for the automatic or semi-automatic removal of surplus material from the end portions of workpieces of elongate form and of substantially circular cross-section. The apparatus is especially suitable for deburring and chamfering the ends of bars and tubes although other cutting operations may be performed also.

It is an object of the present invention to provide apparatus which can perform cutting processes on the ends of elongate workpieces of circular or substantially circular cross-section automatically, or semi-automatically, and treat a large number of such workpieces fed successively into the apparatus.

According to this invention I provide apparatus for the automatic or semi-automatic removal of surplus material from elongate workpieces of substantially circular cross-section comprising in combination; frame means, horizontally disposed slide means mounted on the frame means and slidably supporting a pair of opposed cutting heads, each of the cutting heads being drivingly connected to a rotary cutter, means for moving the cutting heads towards and away from each other for engaging end portions of an elongate workpiece, the cutter having shaped contact faces for centering a workpiece automatically upon simultaneous engagement of the faces with the end portions, holding means for holding a workpiece with its longitudinal axis in substantially co-axial disposition with axis of rotation of the cutters prior to a machining operation and comprising resiliently mounted workpiece support means permitting the workpiece to centre upon engagement of the cutters therewith, ramp means for supplying workpieces to the holding means, workpiece stop means for stopping a workpiece descending the ramp on the support means at a point adjacent to a vertical plane through the axis and control means for controlling the operation of the moving means and the holding means.

The apparatus may comprise a single machine unit in which the movable parts are controllable by electric, pneumatic or hydraulic means, or by a combination or such means. The apparatus may be divided into separate left hand and right hand units adapted to be spaced apart on a work shop floor but controllable as one by the control means. In this manner workpieces of considerable length may be treated. In the divided apparatus the units may be adjustably mounted on slides or rails.

Preferably the apparatus is controlled automatically by electro-pneumatic devices so that the presence of a workpiece on or adjacent to the feed ramp will signal the apparatus to perform a series of timed processes on the workpiece and release the same after the work cycle is completed.

The apparatus may be controlled so that it repeats its work cycle continuously and automatically, or it may be controlled to operate for a set period in which it would process a certain number of workpieces.

The apparatus may be provided with two or more pairs of slide rails spaced apart in parallel disposition and supporting two or more pairs of opposed cutting heads so that two or more workpieces may be processed simultaneously.

The workpiece holding means may comprise a magnetic chuck the chuck plate of which constitutes the workpiece support which may incorporate detents or a friction surface, whereby workpieces of ferrous metal may be retained in a desired working position. The chuck may comprise a mechanical camp for retaining workpieces of non-ferrous metal in the desired position, or it may comprise a combination of the magnetic chuck and the mechanical clamp for retaining workpieces of ferrous or non-ferrous material in position.

The workpiece mounting platform may be movable vertically and adapted to lift the workpiece into approximately the correct position for engagement by the cutters.

The stop means may comprise fixed abutments positioned on or adjacent to the ramp, or it may comprise extendable and retractable members.

It is an important aspect of the invention that the workpiece support platform is resiliently mounted or "floating" and that the cutting tools driven by the cutting head are shaped and adapted for centring the workpiece. Preferably, the cutting heads are driven in contra rotation in order to obviate any tendency for the workpiece to be rotated by the cutters, the support and the clamping means also serve to resist rotation of the workpiece should the torque of the cutting heads become unequal.

By holding the workpiece on a "floating" support approximately in the correct working position and utilising the cutting tools themselves for aligning the workpiece no rigid holding or precise positioning of the workpiece or the tools is required and this greatly simplifies the apparatus and reduces its cost.

The apparatus is primarily intended for deburring and chamfering the ends of elongate bars or tubes of circular cross-section and when such deburring and chamfering is required it is preferable that cutting tools having a conical form are used. For a cutting operation such as deburring or chamfering of the outside end part of a bar or tube a tool of hollowed conical form is used in each cutting head and the bar or tube is centred by the sloping walls of the cutters. For deburring or chamfering the ends of tubes on the inside a male cone shaped cutter is used which engages the end of the tube and centres the same in a similar manner to that described above. The cutters may be adapted to perform a facing operation on the ends of the workpiece.

Where the apparatus includes more than one pair of cutting heads mounted in parallel relationship providing two or more machining stations, it will be realised that two or more separate processes may be carried out by different tools at the same time. For example, in a three station apparatus workpieces in the form of metal tubes of round cross-section may have their ends internally deburred at one station, externally deburred at a second station, and subjected to a facing operation at a third station.

Preferably the means for controlling the operation of the apparatus is provided by electro-pneumatic devices co-ordinated by a timing mechanism which controls the interval of feeding successive workpieces to the cutting heads, the time that the cutters are engaged with the workpiece, withdrawal of the tools and switching off the mechanism at the end of the operation.

Preferred embodiments of the invention will now be described by way of example only with reference to the accompanying drawings wherein:-

Figure 2:
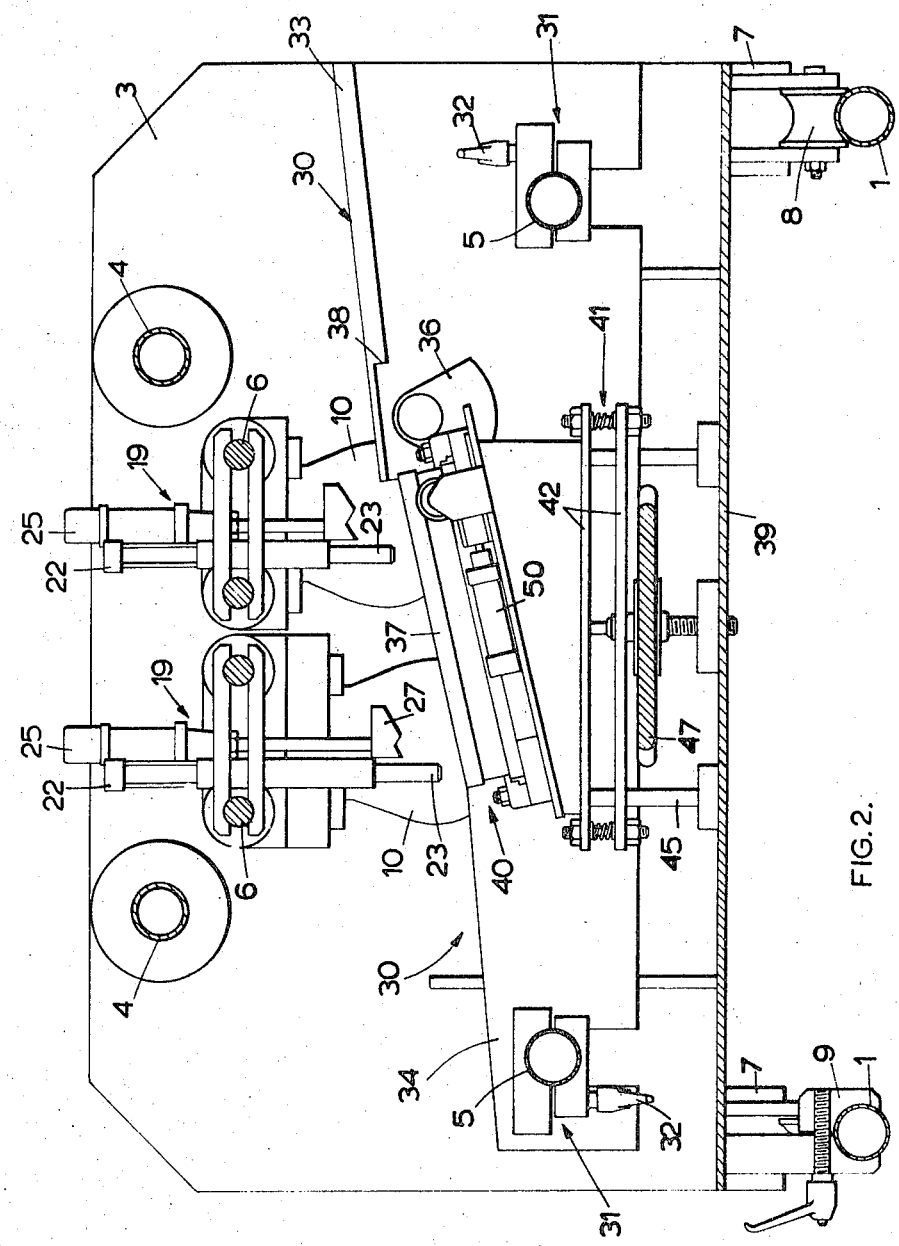
Figure 3:
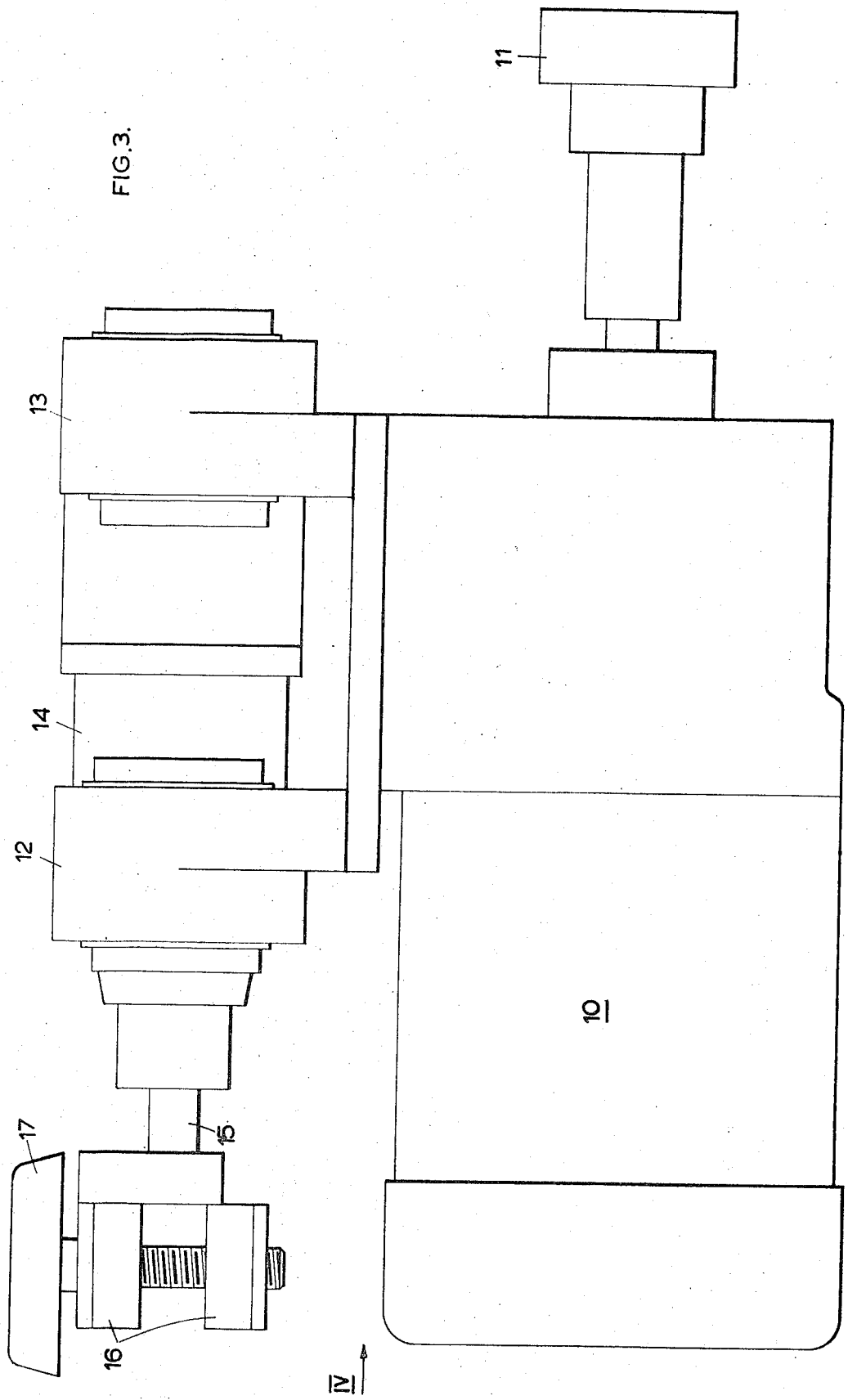
Figure 4:
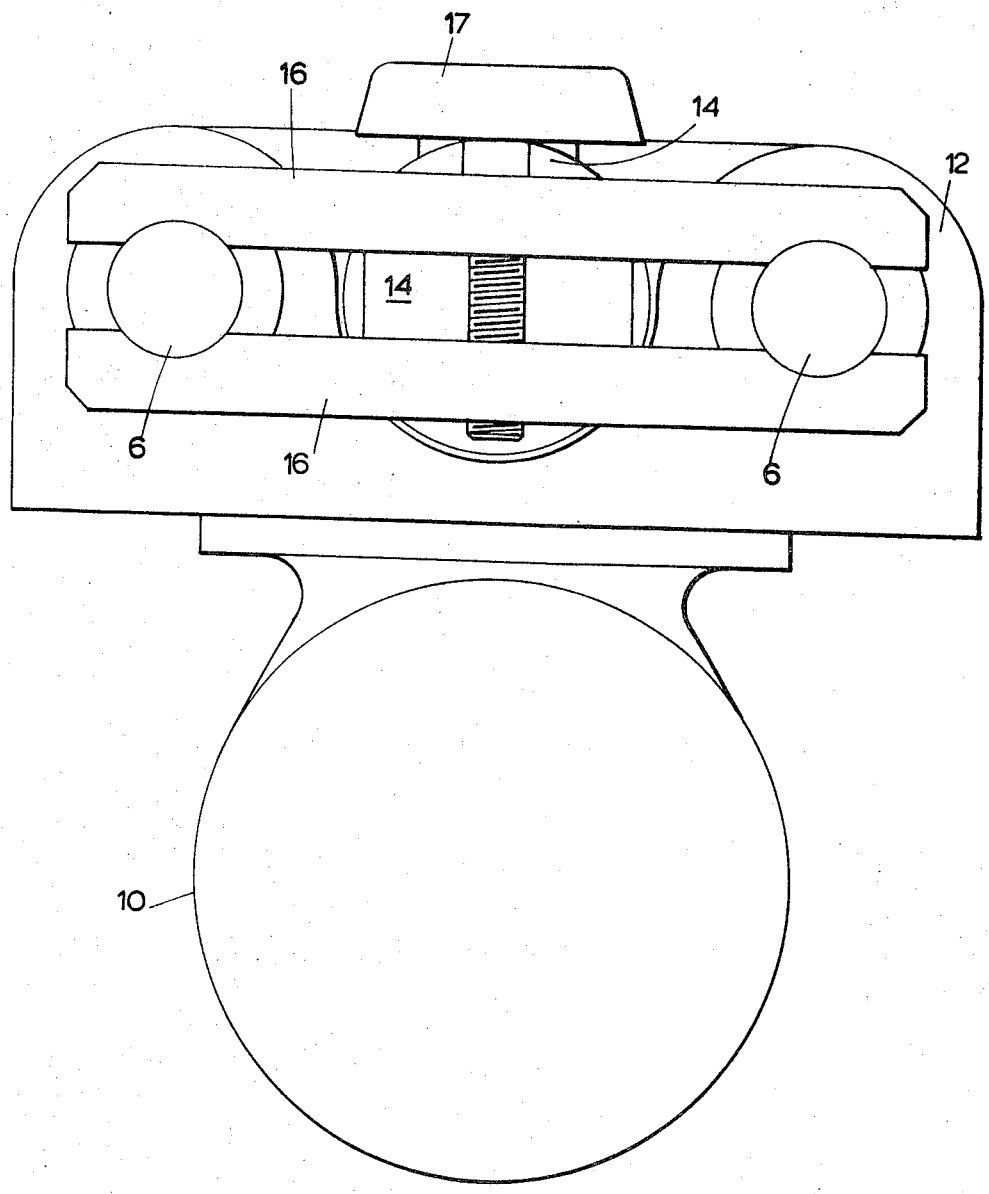
Figure 5:
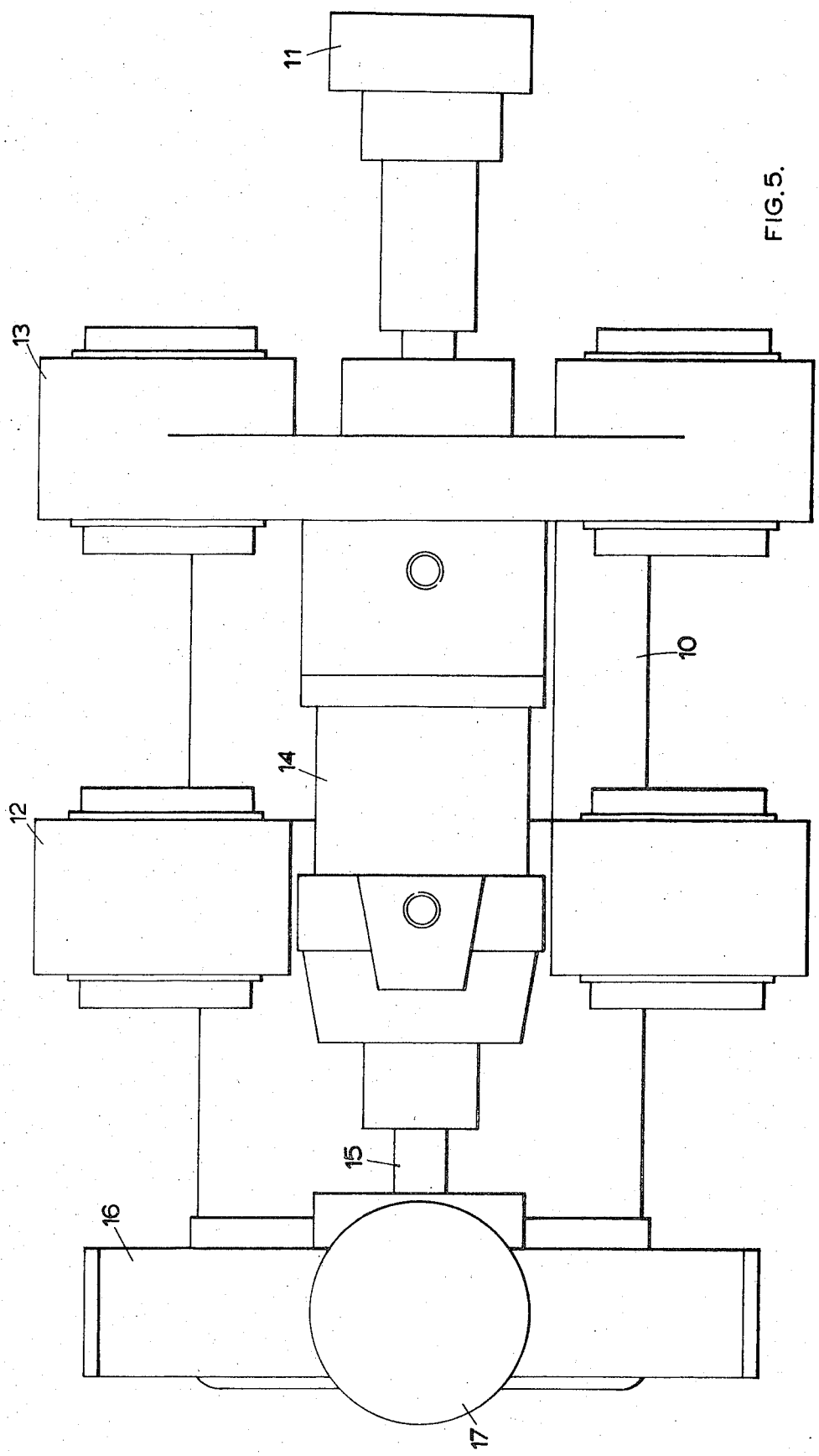
Figure 6:
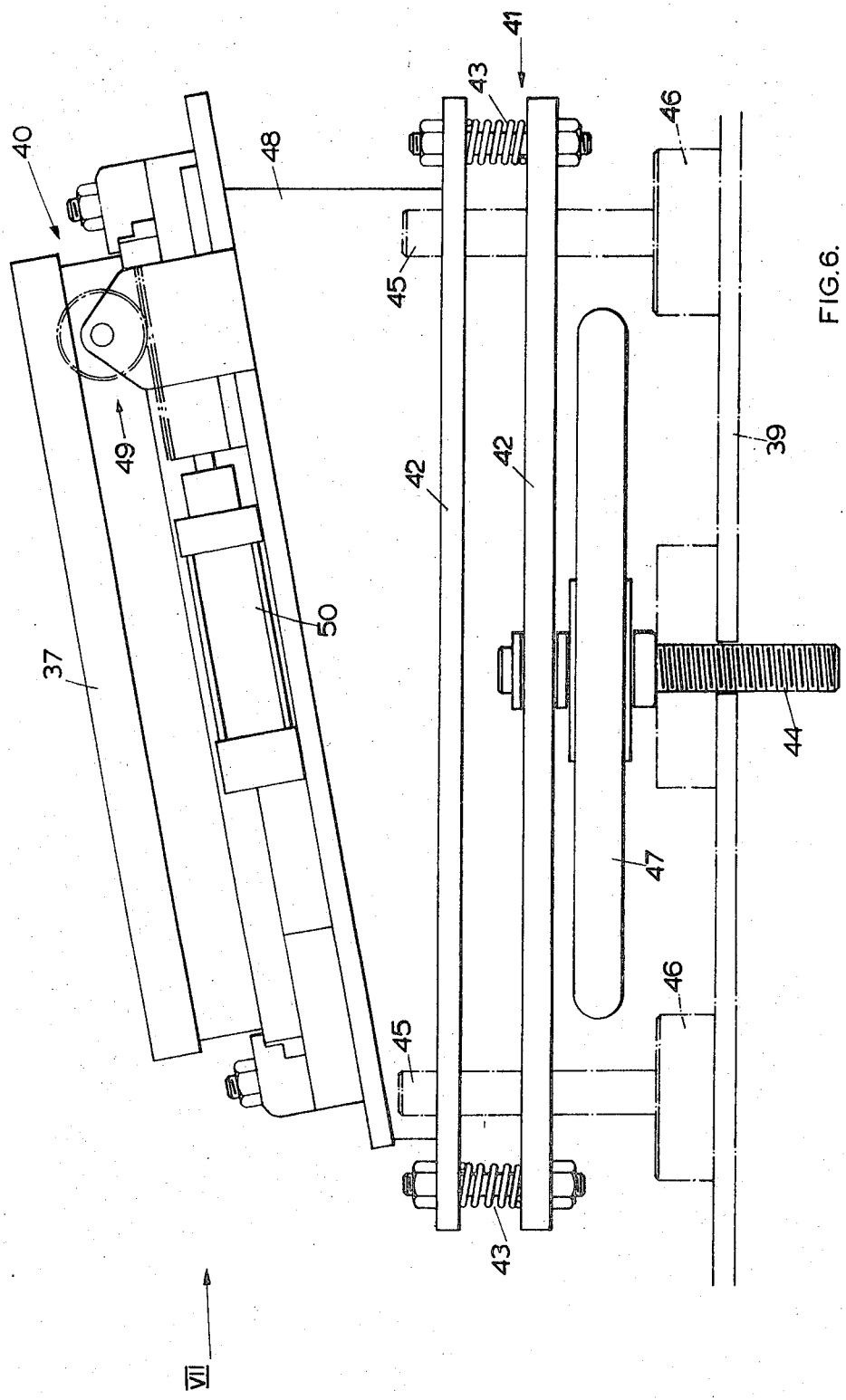
Figure 7:
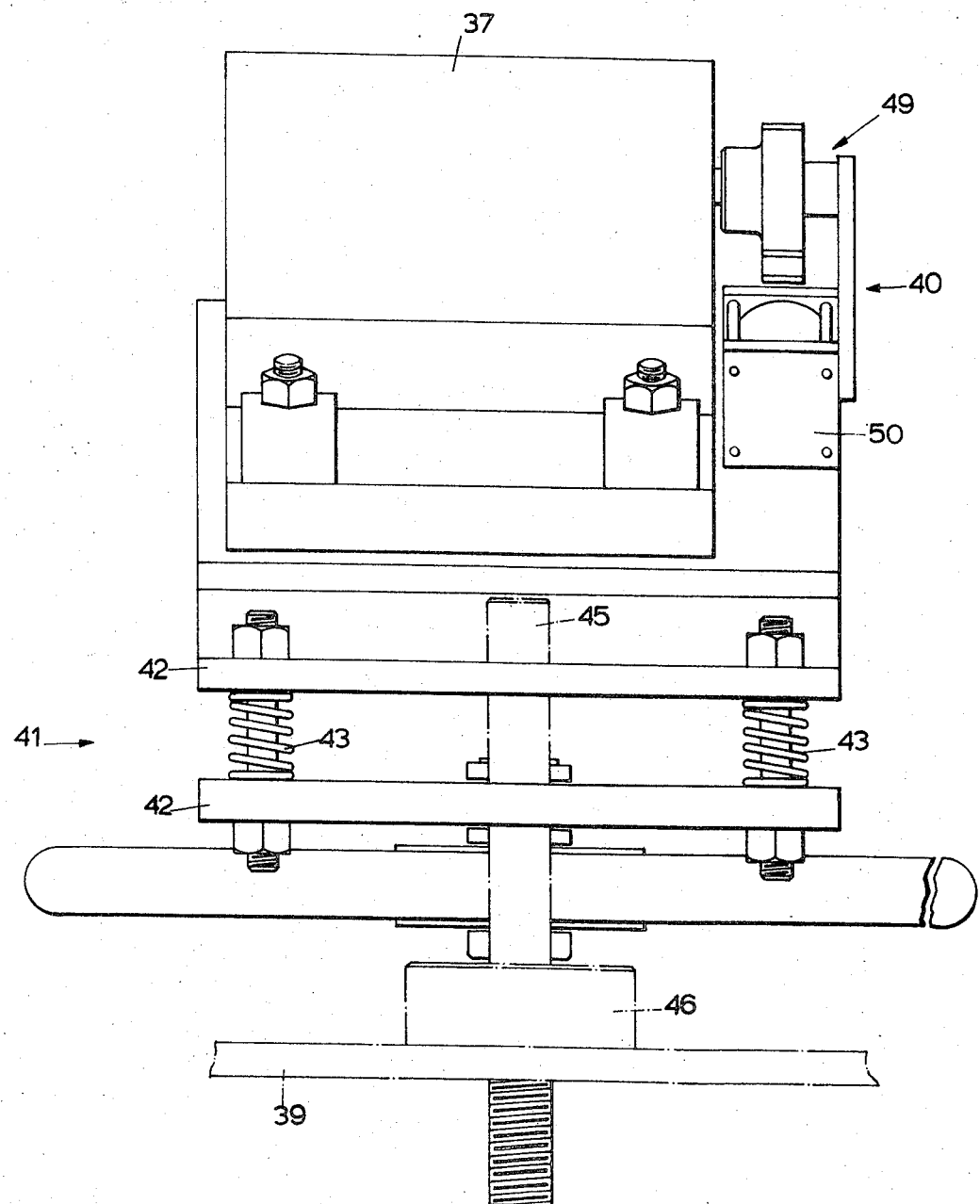
Figure 9:
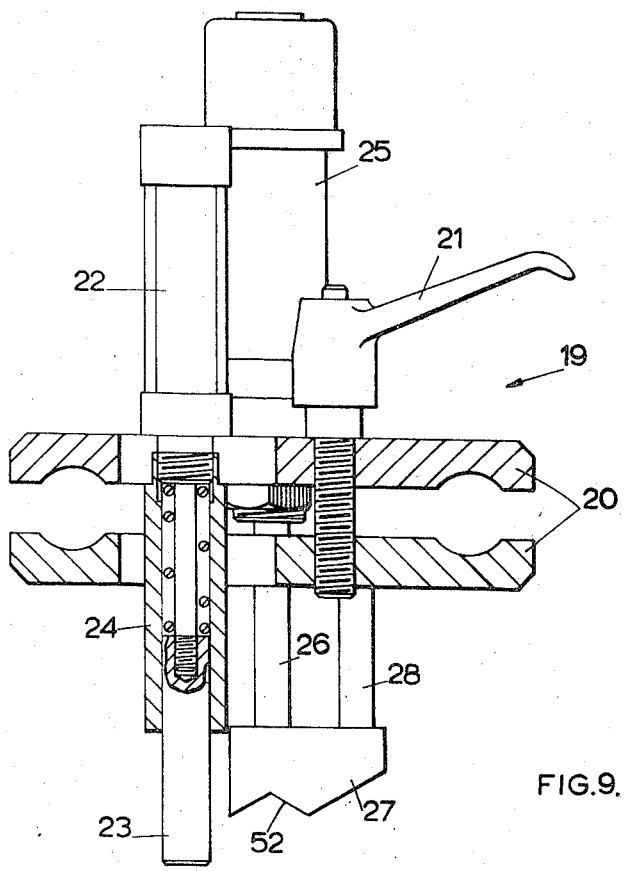
Figure 8:
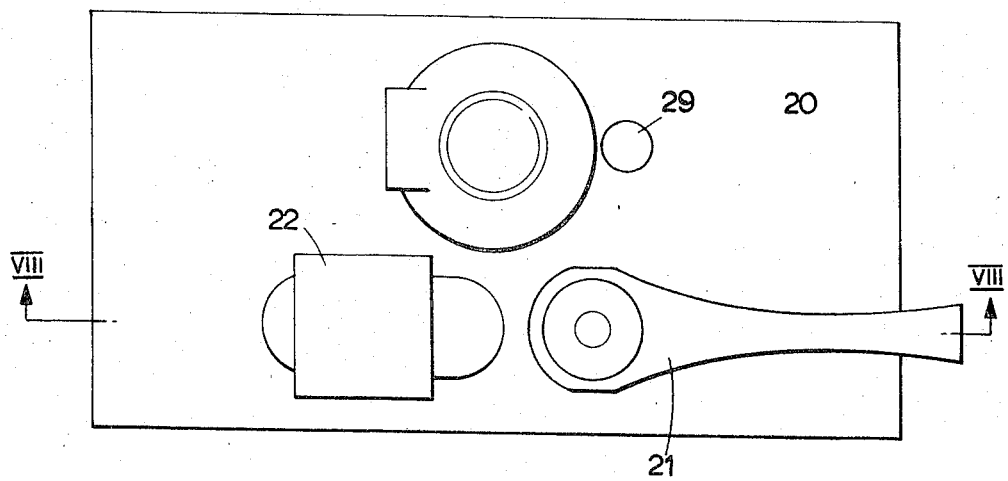
Figure 10:
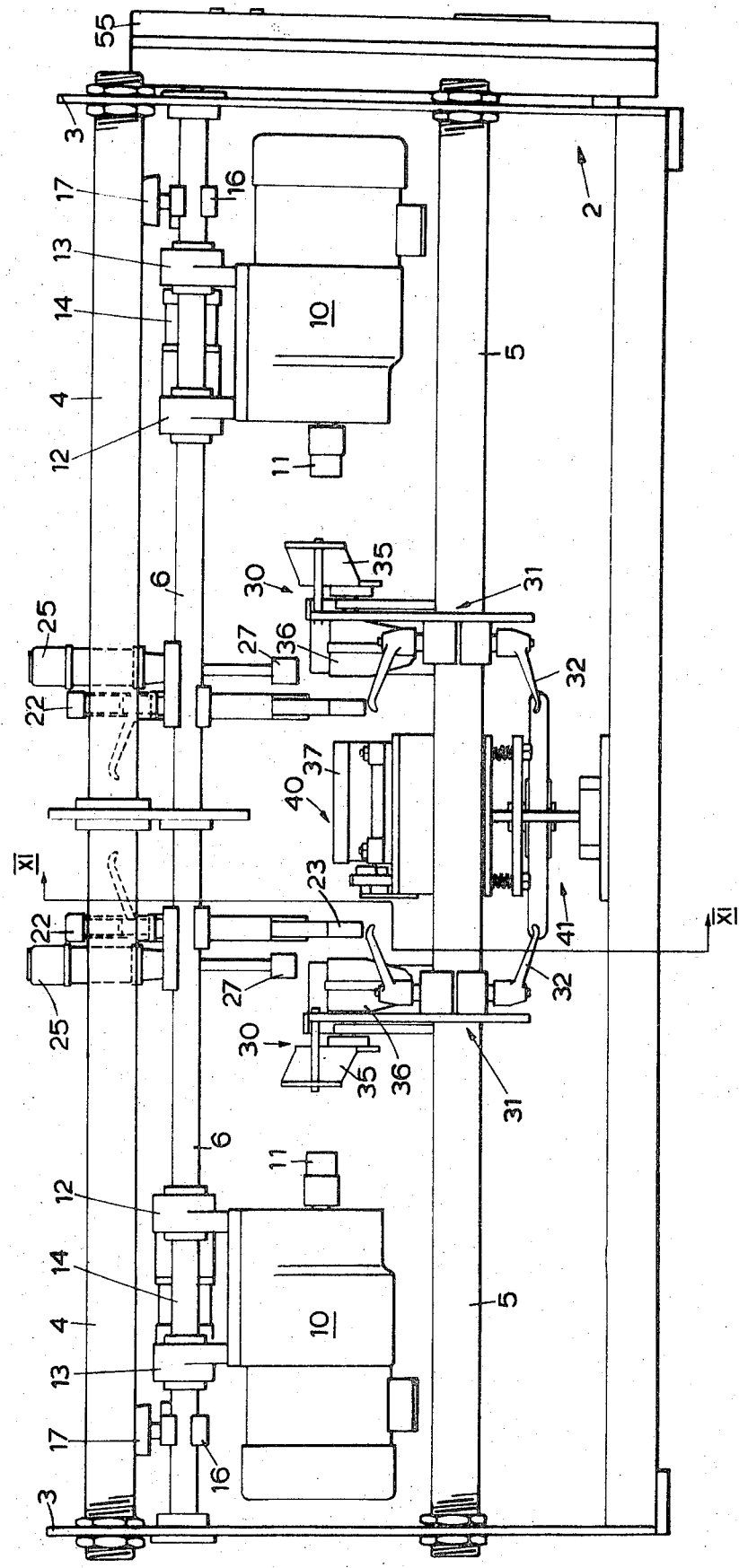
Figure 11:
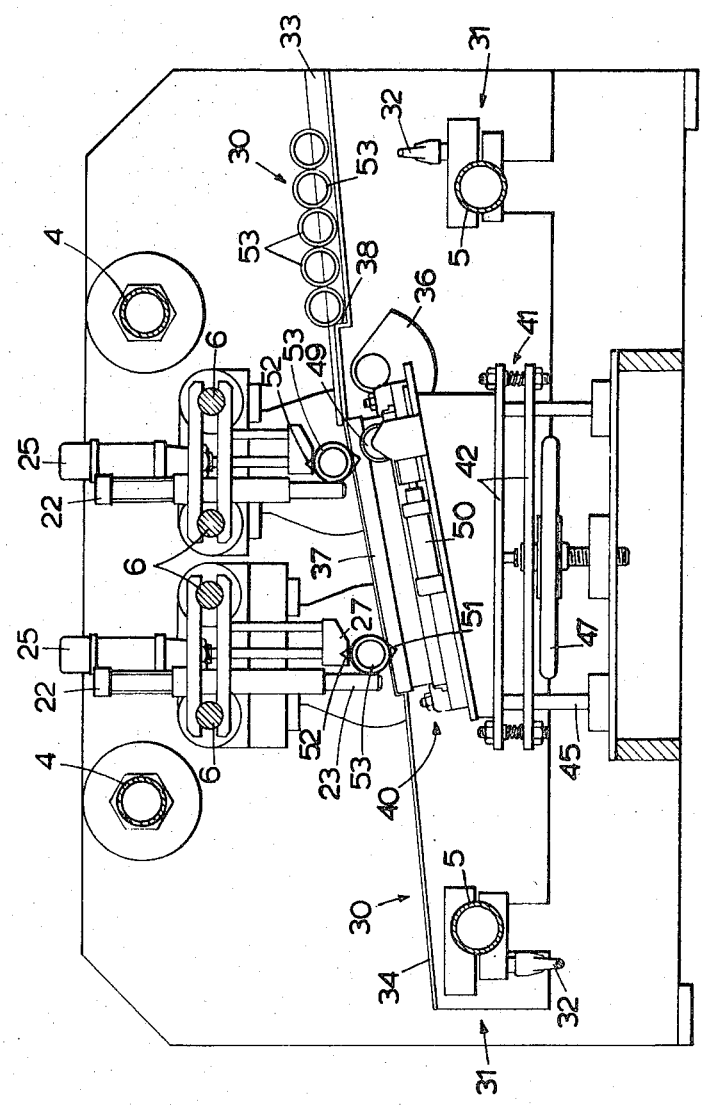
Figure 12:
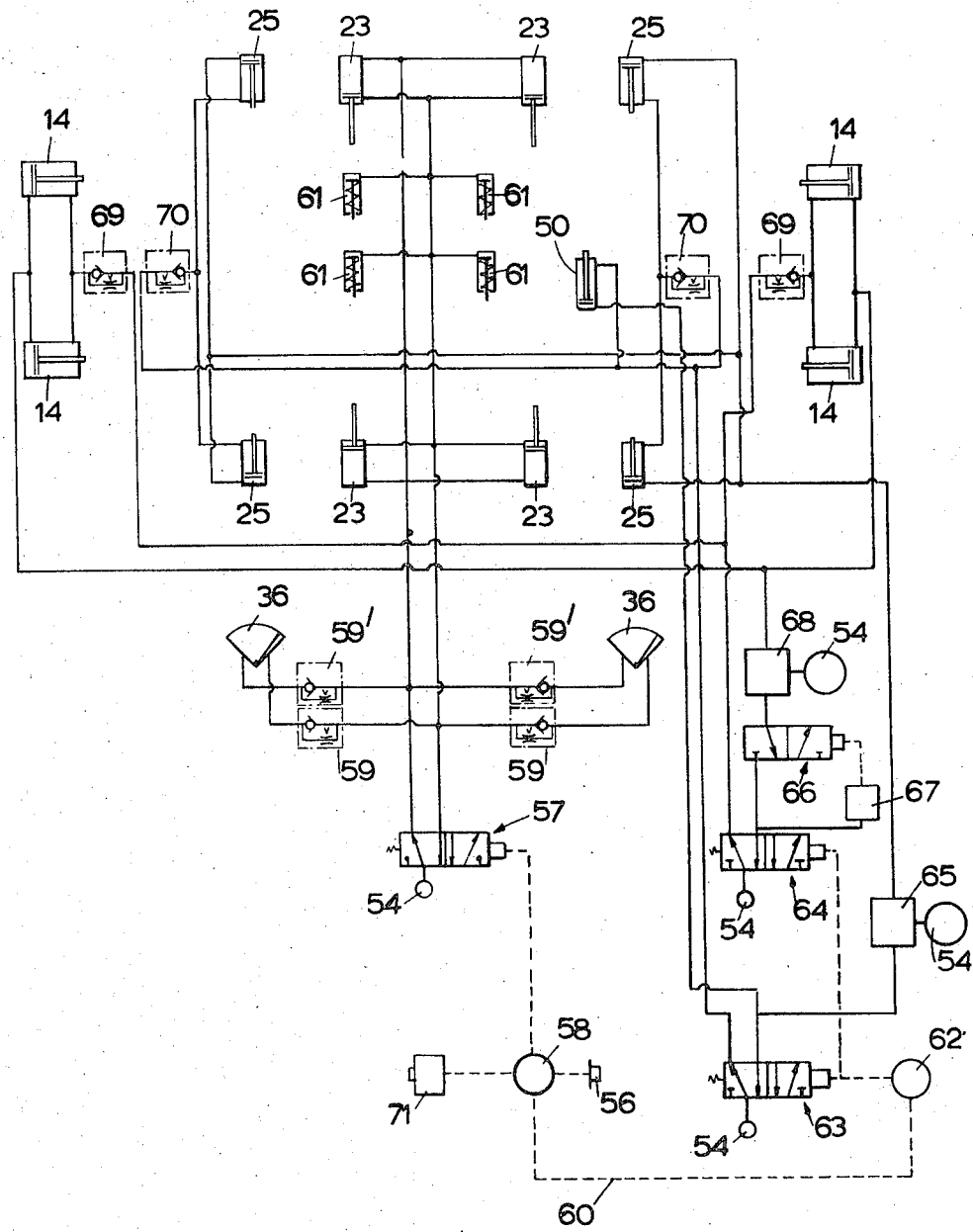
Figure 13:
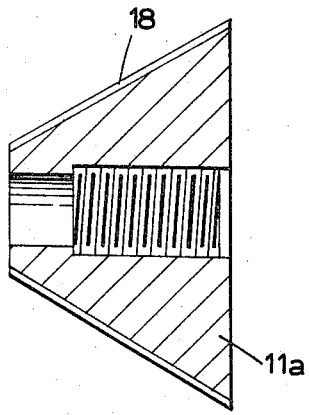
Figure 14:
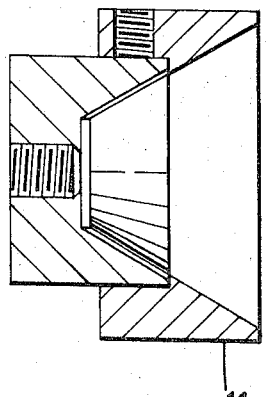

FIG. 1 is a side elevation of the right hand unit comprising part of left and right handed apparatus according to the invention, the left hand unit being a mirror image of the right hand, FIG. 2 is a sectional end elevation of FIG. 1 as viewed on the line II—II of FIG. 1, FIG. 3 is a side elevation of a cutting head and means for mounting the head on a pair of slide rails, FIG. 4 is an end elevation of FIG. 3 as viewed on arrow IV, of FIG. 3, FIG. 5 is a plan view of the cutting head shown in FIGS. 3 and 4, FIG. 6 is a side elevation of a magnetic chuck, FIG. 7 is an end elevation of the chuck shown in FIG. 6 as viewed on arrow VII, FIG. 8 is a plan view of a mechanical clamp assembly, FIG. 9 is a sectional elevation of the clamp assembly of FIG. 8 taken on the line VIII — VIII of FIG. 8, FIG. 10 is a side elevation of a second embodiment of apparatus according to the invention, FIG. 11 is a vertical cross-section taken through the apparatus shown in FIG. 10 on the line XI—XI, FIG. 12 is a line diagram showing the sequence of operation of the apparatus depicted in the FIGS. 10 and 11, FIG. 13 depicts a typical cutter for chamfering or deburring insides of tubes at their ends, and FIG. 14 shows a cutter for chamfering or deburring the outside of bars or tubes at their ends.

FIGS. 1 and 2 show a first embodiment of the invention which provides apparatus for removing surplus material from the ends of bars or tubes of varying lengths and of substantially circular cross-section. The apparatus comprises two separate units which are mounted on the workshop floor in aligned opposed disposition. Only the right hand unit as shown in FIGS. 1 and 2 will be described as the left hand unit is substantially identical. Each unit is mounted on rails 1 and movable one towards the other so that it can be adjusted for processing both long and short workpieces. Each unit comprises a support frame 2 having vertical end plates 3 at each end interconnected by spaced upper and lower pairs of horizontal tie bars 4 and 5 respectively. The right hand end plate provides a mounting for a control box (not shown). The left hand end plate is divided into upper and lower portions spaced apart so as to leave a clear central area through which the workpiece extends. Two pairs of parallel horizontally disposed slide rails 6 extend between the right hand support plate 3 and the upper one of the left hand support plates, the rails 6 are centrally disposed in the frame between the upper tie bars. The two pairs of slide rails 6 are spaced apart but in the same plane. The lower pair of tie bars 5 have a wider spacing than the upper pair 4 and extend between the right hand end plate 3 adjacent to its lower edge and the upper edge of the lower left hand support plate 3. A pair of chassis members 7 extend between the right hand support plate 3 and the lower one of the left hand support plates which provide mountings for two pairs of rollers 8, one pair being positioned adjacent to each end of each unit. The rollers 8 engage tubular rails 1 fixed to the floor of the work area. A clamp 9 is provided on one chassis member to enable the unit to be locked to the rails 1 in the desired position.

Mounted one on each of the two pairs of slide rails 6 are a pair of electrically powered cutting heads 10 the cutters 11 of which both face inwardly towards the space between the upper and lower left hand support plates 3. Each cutting head 10 is mounted by means of front and rear mounting brackets 12 and 13 comprising linear bearings which slidably suspend the cutting head 10 beneath and centrally between the pair of slide rails 6. A pneumatic cylinder 14 is supported between the rear bracket 12 and front bracket 13. The body of the cylinder 14 is fixed to the brackets 12 and 13 with the ram 15 extending rearwardly. The end of the ram 15 is rigidly connected to a slide clamp comprising a pair of clamping bars 16 which extend laterally between the pairs of slide rails 6 and incorporate a hand nut 17 for clamping the cutting head 10 in the required position on the slide rail 6 or releasing it for longitudinal movement therealong. The mounting arrangement for each cutting head 10 is more clearly shown in FIGS. 3, 4 and 5. Each cylinder 14 is connected, by means of air pipelines (not shown) to an automatic control mechanism and a pressure source so that in use when the cutting heads 10 are clamped to the slide rails 6 and the rams 15 thereof are extended or retracted each cutting head 10 will move axially along the slide rails 6. Typical cutters 11 and 11a for use with the cutting heads 10 of this machine are shown in FIGS. 13 and 14. FIG. 13 shows a cutter 11a of frustroconical shape having a fluted cutting face 18. This cutter is used for the internal deburring or chamfering at the end of tubes. The cutter 11 shown in FIG. 14 is the female counterpart of the cutter shown in FIG. 13 and is used for the deburring or chamfering the outside edge at the end of a bar or tube. Both cutters are readily removable from the end of the cutting head drive. The cutter may have a file, instead of a fluted cutting surface.

A workpiece clamping assembly 19 is mounted on each pair of slide rails 6 inwardly of the cutting heads 10 and is clamped between the rails by means of split clamp 20 similar to those used for clamping the cutting heads. Each assembly 19 is provided with a ratchet handle nut 21 to enable the assembly to be positionally adjusted on the slide rails 6. Each assembly 19 supports a two way air cylinder 22 mounted over an aperture in the top clamping plate 20 as shown in FIGS. 8 and 9 and having a workpiece backstop extending vertically downwards through a similar aperture in the bottom clamping plate 20. The backstop comprises a mandrel 23 which reciprocates within a bush 24 when driven by the air cylinder 22. The bush is provided to stiffen the stop against impact by a workpiece. The assembly 19 further comprises a pneumatic ram 25 mounted on the top clamping plate 20 adjacent to the air cylinder 22 the ram rod 26 of which extends downwardly from the top clamping plate 20 parallel with the mandrel 23 of the backstop. A clamping block 27 having a V-shaped notch in its lower part is carried on the end of the ram rod 26 and is prevented from rotating by a guide rod 28 which extends vertically from the clamping block through co-axial holes 29 in the upper and lower clamping plates 20. The air cylinder 22 and the pneumatic ram 25 are pneumatically connected to the remote automatic control mechanism which controls their extension and retraction. The control mechanism will be described in more detail hereinafter.

A ramp 30, one half of which is incorporated in each unit, extends transversely of each unit and is adjustably supported on the lower tie bars 5 as shown in FIGS. 1 and 2. The ramp 30 is formed from a pair of wedge shaped plates mounted in the vertical plane. The adjusting mechanism comprises pairs of split clamps 31 and ratchet handle nuts 32 rigidly connected to the side of each plate. On one side of the unit a portion of the ramp 30, constituting a feed tray 33 for the workpieces, is at a higher level than the other end of the ramp on the far side of the unit which constitutes the ramp exit 34. The feed tray 33 comprises an adjustable guide 35 mounted on the top edge of the ramp 30 which serves to guide workpieces down the ramp incline towards the cutting heads. A notch 38 is provided on the top edge of the feed tray 33 which stops a workpiece within reach of a rotary cam 36. The rotary cam 36 is mounted on the inner face of the ramp 30 close to the lower end of the feed tray 33 and adjacent to the top edge top thereof. The cam 36 is pneumatically connected to the control mechanism for automatic operation and is adapted to rotate in such a way that a workpiece is lifted from the feed tray so that it can roll down the ramp onto a support platform 37 normally positioned beneath the cutting heads 10.

The platform 37 comprises the chuck plate of a magnetic chuck assembly 40 which is resiliently mounted on the floor 39 of the unit in a central position below the vertically extendable stops 23 and workpiece clamps 27 and adjacent to the ramp. In FIG. 1 the chuck assembly is shown to the left of the cutting heads for the sake of clarity. The chuck 40, which is shown in detail in FIGS. 6 and 7, cooperates with the above described extendable clamps 27 in order to hold both ferrous and non-ferrous workpieces in position whilst they are being machined. The resilient mounting comprises an adjustable platform 41 having a pair of rectangular plates 42 held in spaced relationship by means of four coiled springs 43 positioned one in each corner and through which bolts extend. The platform 41 is mounted on a centrally positioned threaded spindle 44 for movement in the vertical plane and a pair of fixed guide pins 45 extend upwardly from mounting blocks 46 on the floor 39 of the unit through co-axial guide holes in the pair of plates 42. A wheel 47 is fixed to the spindle 44 for adjusting the chuck assembly 40. The magnetic chuck assembly 40 is mounted on top of a pair of wedge shaped plates 48 attached to the upper one of the pair of plates 42 so that the magnetic plate 37 is inclined at an angle of about 20°, this angle being consistent with that of the ramp 30. The chuck 40 is of known type having a surface incorporating a series of magnets separated by insulating material. The magnetism of the chuck is activated and suppressed by the action of a rack and pinion 49 actuated by a pneumatic ram 50 which is automatically controlled by the aforementioned control mechanism.

In use of the apparatus of the herein above described embodiment two workpieces can extend between the left hand and right hand units and each is held between a clamp 27 and chuck plate 37 during the machining operation. It will be appreciated that the components comprising the right hand unit are duplicated in the left hand unit and the two units are connected only by pneumatic and electric control lines leading from the console. As the operation of apparatus according to this embodiment is substantially the same as that in respect of a second embodiment, now to be described, only the operation of the second embodiment will be described in detail as the latter incorporates one additional mechanism. Also, as in all other respects the components comprising the first and second embodiments are the same those of the second embodiment will not be described in detail. For convenience identical reference numerals identity identical, or substantially identical, components of both embodiments.

The second embodiment of the bar or tube chamfering or deburring apparatus is shown in FIGS. 10 and 11. This apparatus is primarily intended for processing workpieces of considerably shorter length than those processed in the apparatus shown in FIGS. 1 and 2. Accordingly, the apparatus is constructed as a single stationary unit which is mounted directly on the floor of the workshop. Also this apparatus is primarily intended for chamfering or deburring the ends of bars and tubes of non-ferrous metal and consequently minor modifications are preferably incorporated in the clamping arrangement for the workpieces and in the method of their release from the chuck after processing. It is to be understood however that these modifications may also be incorporated in the first embodiment if desired or omitted from the second embodiment.

As the magnetic chuck 40 would be non-effective for holding workpieces of non-ferrous metal in the apparatus shown in FIGS. 10 and 11 V-shaped grooves 51 are incorporated in the magnetic plate of the chuck 37. These grooves 51 are vertically aligned with and cooperate with the V-shaped notches 52 incorporated in the clamping blocks 27 and in use of the apparatus a a bar or tube 53 is lifted from the feed tray 33 by the pair of rotary actuators 36, rolls down the ramp 30 onto the magnetic support plate 37 and is arrested by the back stops 23 and the V-shaped groove 51 and is subsequently clamped in the groove 51 by the clamping blocks 27. In the case of the first embodiment the workpieces are released by de-activating the magnetic chuck 40 and raising the backstops 23 so that the workpieces roll off the magnetic plate 37 of the chuck and descend down the ramp 30 under gravity. When the grooves 51 are incorporated not sufficient merely to raise the backstops 23 to release the workpieces 53 as they tend to remain in the V-shaped grooves 51 in the magnetic chuck plate 37. Consequently, pairs of ejectors 61 constituting the additional mechanism, are incorporated similar to the rotary actuators 36 described in connection with the FIG. 1 embodiment. For the sake of clarity the pairs of ejectors which are positioned below each chuck plate 37 and adjacent to each groove 51 have been omitted from FIGS. 10 and 11. Each ejector 61 comprises an air cylinder for operating a rotary cam which serves to lift the workpiece 53 from the notch 51 onto the exit side of the ramp.

The operation of the second embodiment shown in FIGS. 10 and 11 will now be described in detail with reference to FIG. 12 and it will be realised that the only difference between the operational sequences for the first embodiment and the second embodiment is that in the case of the first embodiment the ejectors 61 are omitted.

Referring now to FIGS. 10, 11 and 12 and assuming that the apparatus is pneumatically connected to a pressure source 54 and electrically connected to a power source 60 the following sequence of operation can be initiated from a control console 55 mounted on the vertical end plate 3 of the support frame 2. It is to be understood that all the movable components at both machining stations operate simultaneously.

In FIG. 12 all solenoids are shown in the inoperative position. When the start button 56 is pressed it energises a first solenoid 57 and first timer 58. Solenoid 57 switches over and directs compressed air to the right side of the pair of rotary cams 36, via flow control valves 59, which rotate in such a way as to lift a new workpiece 53 from the feed tray 33 and onto the ramp 30. Compressed air is also directed to the front end of the two pairs of backstops 23, which are shown extended, and to the two pairs of ejector cylinders 61 which rotate the ejectors to eject workpieces from the V-shaped grooves 51 in the chuck plate 37. Simultaneously, the backstops 23 are retracted which permits a workpiece 53 released from the second or lower machining station to descend the exit end 34 of the ramp 30 and a workpiece 53 released from the first or higher machining station to roll towards the second station. The new workpiece 53 lifted from the feed tray 33 begins to roll towards the first station.

When the first timer 58 times out the first solenoid 57 returns by spring means to the inoperative position and compressed air is directed to the opposite ends of the backstop cylinders 23 so that the stops extend again in time to arrest the two workpieces rolling down the ramp 30. Compressed air is also directed to the opposite ends of the rotary cams 36 via flow control valves 59' which return to their original position primed for reloading. The ejector cylinders 61 are opened to exhaust permitting the ejectors to return under spring force to their original positions below the chuck plate 37.

A second timer 62 now initiates the operation of the clamping mechanism and deburring head cylinders 14 via second and third solenoids 63 and 64 respectively. Solenoid 63 switches over and directs compressed air to the rear of the cylinder 50 shown retracted, thereby operating the chuck 37 and activating the magnets. Compressed air is also directed to the two pairs of clamp cylinders 25 via a first pressure booster 65 which provides the necessary clamping force to clamp the workpieces against the chuck plate 37. The clamp rams are extended under control of flow control valves 70.

The third solenoid 64 switches over and directs compressed air to a fourth solenoid 66 via a third timer or dwell unit 67 which momentarily delays the switching of the solenoid 66 and actuation of the deburring head cylinders 14. When solenoid 66 switches over it directs compressed air to the rear side of the rams in both pairs of cylinders 14 via a second pressure booster 68. The cutting heads 10 move inwardly under the control of flow control valves 69 and the cutters 11 engage the ends of the workpiece for the deburring or chamfering operation. Clamping of each workpiece by the vertical clamps 25 and chuck 37 is substantially instantaneous but operation of the cutting head cylinders 14 is delayed to ensure that the workpieces are properly clamped before machining commences.

The second timer 62 controls the duration of the machining process and on completion reverses solenoids 63 and 64 causing the clamps 25 to retract, the magnetic chuck 37 to de-activate, and the cutting heads 10 to withdraw.

Retraction of the cutting heads 10 activates a proximity switch 71 which re-energises the first timer 58 thus replacing the manually operated starter button and creating a fully automatic continuous recycling. Timer 58 is energised for about a ½ second which is sufficient to ensure that the backstops are in position when the workpiece from machining station 1 arrives at station 2. Alternatively, the proximity switch may be positioned adjacent to the feed tray 33 so that recycling is triggered only by the presence of another workpiece in the feed tray.

As hereinbefore stated, it is an important aspect of this invention that the workpiece support platform, that is the magnetic chuck, is resiliently mounted and that the cutters in the cutting heads are of the kind which will centre the workpiece for the machining operation. Thus it is unnecessary for the workpiece to be supported and clamped exactly co-axially with the axis of the cutters as, when the cutters engage the ends of the workpiece, as for example the male and female cone cutters, the resiliently mounted table can move into the correct supporting position when the workpieces are co-axially supported between the cone cutters. As the cutting heads are driven in contra rotation there is normally no tendency for the workpiece to rotate, but should the torque of one cutting head exceed the other the magnetic half of the chuck in co-operation with the V-shaped notches 52 in the clamping blocks 27 will prevent such rotation.

For the smaller and lighter workpieces of ferrous materials it may not be necessary to provide the vertically extending mechanical clamps and in one modified form of the machine a single workpiece machining station is provided in which the workpiece is supported and clamped between a pair of opposed cutting heads by means of a single magnetic chuck.

In another modified form of the invention for use with workpieces of non-ferrous material the retractable backstops are omitted and replaced by a pair of fixed abutments on a feed ramp positioned beneath and adjacent to a single machining station. The magnetic chuck is replaced by two pairs of opposed horizontally extending V-clamps which are controlled to grip the sides of the workpiece at two points. A pair of resiliently mounted vertically movable feed platforms are positioned in spaced positions adjacent to the sides of the ramp and the aforementioned abutments and are controlled to lift a workpiece arrested by the stops into substantially the correct machining position, whereupon the V-shaped clamps are then operated to grip the workpiece for the machining operation.

With respect to apparatus of the first embodiment when it is required to remove material from workpieces of considerable length it may sometimes be necessary to support the workpiece at a point midway between the right and left hand units to prevent it sagging. In this situation the apparatus is provided with support means incorporating devices for stopping, clamping, releasing, and moving the workpiece onwards which are synchronised with the similar devices positioned adjacent to the ends of the workpiece.

Whilst apparatus described herein utilizes single, or first and second laterally spaced machining stations it will be appreciated that further work stations could be provided in the same apparatus by extending the width of the ramp and providing further sets of components for performing the desired operations.

When it is required to perform a facing operation on the ends of a bar or tube, a female conical tool similar to that shown in FIG. 14 which incorporates a flat file or milled disc in its bottom part, is mounted in the cutting head.

I claim:

1. Apparatus for the removal of surplus material from the end portions of elongate workpieces of substantially circular cross-section comprising in combination, frame means, horizontally disposed slide means mounted on said frame means, a pair of opposed co-axial cutting heads slidably mounted on said slide means, each of said cutting heads being drivingly connected to a rotary cutter, means for moving said cutting heads and said cutters towards and away from each other for engaging end portions of an elongate workpiece, contact face means on said cutter for centering a workpiece automatically upon simultaneous engagement of said face means with said end portions, holding means for holding a workpiece in substantially co-axial disposition with the axis of rotation of said cutters and comprising resiliently mounted workpiece support means, ramp means for supplying workpieces to said holding means, workpiece stop means for stopping a workpiece descending said ramp means on said support means at a point adjacent to a vertical plane through said axis, and control means for controlling the operation of said moving means and said holding means.

2. Apparatus as claimed in claim 1 wherein said holding means comprises movable clamping means for engaging the sides of a workpiece.

3. Apparatus as claimed on claim 2 wherein said support means comprises a support platform adjustably mounted on said frame means.

4. Apparatus as claimed in claim 3 wherein said stop means comprises extendable and retractable means operable through said control means.

5. Apparatus as claimed in claim 4, wherein said stop means comprises a pair of spaced members located adjacent to said vertical plane and operable for movement towards and away from said ramp means.

6. Apparatus as claimed in claim 3 wherein said platform comprises magnetic chuck means operably connected to said control means whereby a ferrous workpiece may be held on said platform.

7. Apparatus as claimed in claim 6 wherein said movable clamping means is movable towards and away from said magnetic chuck means and is co-operable therewith for holding a workpiece in substantially co-axial disposition on said platform.

8. Apparatus as claimed in claim 7 wherein said movable clamping means incorporates a V-shaped notch for gripping the sides of a workpiece supported on said platform.

9. Apparatus as claimed in claim 6 wherein said ramp means comprises a pair of spaced substantially parallel wedge shaped members extending normal to said longitudinal axis such that the higher end portions of said pair of members are adjacent to said axis on one side of said frame means and lower end portions thereof terminate on the opposite side of said frame means beyond said axis, said higher end portions being provided with abutment means for retaining workpieces on said higher end portions.

10. Apparatus as claimed in claim 9 further including a workpiece feed actuator positioned adjacent to said abutment for feeding workpieces successively from said higher portions to said magnetic chuck means at predetermined intervals, said feed actuator being operably connected to said control means.

11. Apparatus as claimed in claim 9 wherein said magnetic chuck means is resiliently mounted between said wedge shaped members with said platform sloping at substantially the same angle and in the same direction as said wedge shaped members.

12. Apparatus as claimed in claim 11 wherein said chuck means is mounted for adjustment in the vertical plane.

13. Apparatus as claimed in claim 11 further including a plurality of spaced laterally disposed slide means supporting a plurality of pairs of opposed co-axial cutting heads and said moving means, said movable clamping means, and said extendable and retractable stop members are multiplied to provide sets of components at a plurality of machining stations operable by said control means.

14. Apparatus as claimed in claim 10 wherein said feed actuator, said stop means said magnetic chuck means, said movable clamping means, and said moving means for said cutting heads are operable by electro pneumatic devices operable by said control means in a predetermined sequence.

15. Apparatus as claimed in claim 14 wherein said control means includes timing devices for sequential operation in a predetermined period of said feed actuator, said stop means, said magnetic chuck means, said clamping means and said moving means.

16. Apparatus as claimed in claim 14, wherein said control means includes a workpiece sensing device for sensing a workpiece on said higher portions, said sensing device automatically restarting said predetermined sequence.

17. Apparatus as claimed in claim 14 wherein said control means includes a sensing device for sensing the return movement of said cutting heads whereby said predetermined sequence is automatically restarted upon said return movement.

18. Apparatus as claimed in claim 8, wherein said platform incorporates a V-shaped groove for receiving a workpiece and gripping the same in co-operation with said V-shaped notch, ejector means controllable by said control means being provided to eject a workpiece from said groove.

19. Apparatus as claimed in claim 1 wherein said frame means comprises left hand and right hand frame units adjustably supported in aligned spaced disposition, each of said units including horizontally disposed slide means carrying one of said pairs of cutting heads, said holding means, said ramp means, and said stop means.

20. Apparatus as claimed in claim 19 wherein each frame unit is mounted on rail means for adjustment towards and away from each other.

* * * * *